(No Model.)

M. PATCHIN.
SPREADER FOR GRAIN BINDERS.

No. 461,271. Patented Oct. 13, 1891.

Witnesses
M. B. Harris
Denis J. Downing

Inventor
Myron Patchin

By N. W. Fitz Gerald & Co.
Attorneys

UNITED STATES PATENT OFFICE.

MYRON PATCHIN, OF MIDDLEFIELD, OHIO.

SPREADER FOR GRAIN-BINDERS.

SPECIFICATION forming part of Letters Patent No. 461,271, dated October 13, 1891.

Application filed January 5, 1891. Serial No. 376,822. (No model.)

*To all whom it may concern:*

Be it known that I, MYRON PATCHIN, a citizen of the United States of America, residing at Middlefield, in the county of Geauga and State of Ohio, have invented certain new and useful Improvements in Spreaders for Grain-Binders, of which the following is a specification, reference being had therein to the accompanying drawings.

My invention has relation to spreaders for grain-binders; and it consists in the construction and novel arrangement of parts, as hereinafter more fully described, illustrated in the accompanying drawings, and pointed out in the appended claim.

Figure 1:
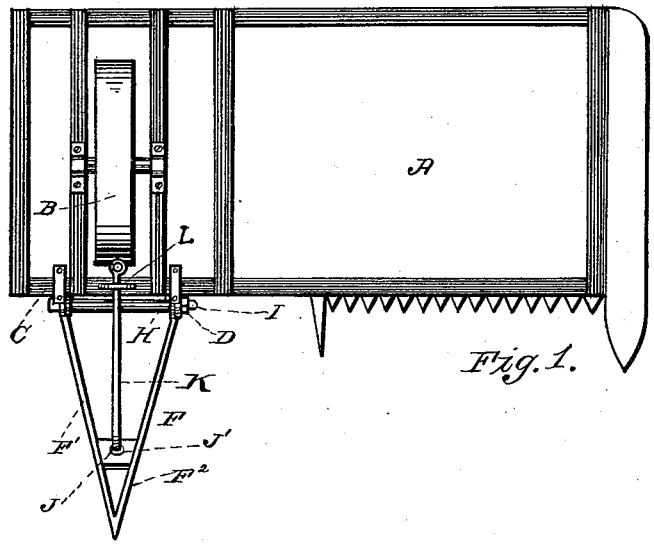
Figure 2:
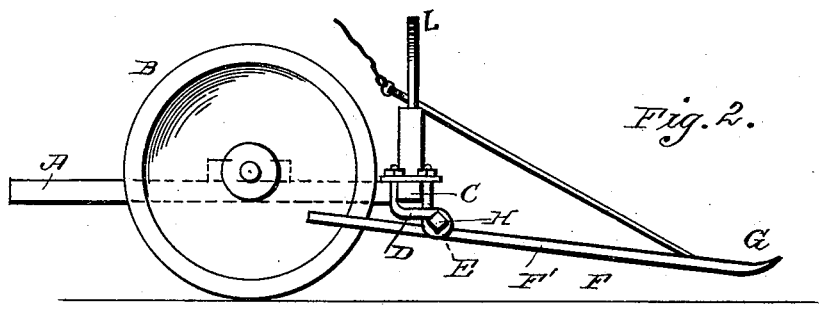
Figure 3:
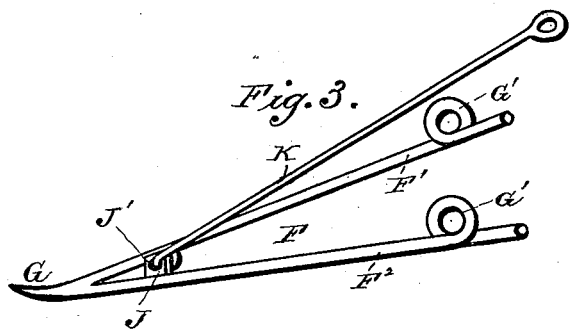

In the drawings, Figure 1 is a plan view of my improved spreader attached to so much of a binder as will suffice to illustrate the application of my improvement. Fig. 2 is a detail side view of my invention. Fig. 3 is a detached perspective view of the same.

Referring to the accompanying drawings, in which like letters of reference indicate corresponding parts in all the figures, the letter A designates the frame-work of a binder, and B the drive-wheel thereof. Secured to the frame immediately in front of the drive-wheel is a beam C, to which is attached at a suitable distance apart clip-ties D, provided at their lower ends with eyes E for a purpose presently explained.

The letter F designates the spreader, which by preference is composed of the two side bars $F'$ $F^2$, welded together at their outer ends and given a slight upward bend, as G. Near their inner ends the side bars $F'$ $F^2$ are provided with eyes $G'$, registering with the eyes E in the clip-ties.

H designates a bolt provided with a screw-threaded portion carrying a nut I and passing through the eyes E and $G'$ and holding the spreader to the binder.

In order that the point of the spreader may be readily raised or lowered when desired, a transverse plate J is secured between the bars $F'$ $F^2$, provided with an eye $J'$, in which is secured one end of an adjusting-rod K, which passes through a U-shaped guide L, secured to the beam C between the clip-ties D, and has attached to its end a cord or chain, which passes over a pulley and is secured to the seat on the binder within easy reach of the driver.

It is a well-known fact that in binders the drive-wheel crushes to the ground a great deal of the standing grain, which is a total loss to the farmer. With my improved spreader this loss is overcome. Owing to the shape of the spreader the grain is separated and a path formed for the drive-wheel.

Having thus fully described my invention, what I claim as new, and desire to secure by Letters Patent, is—

In a spreader for binders, the combination, with the side bars provided with eyes and united at their outer ends, the transverse plate between said bars, and the adjusting-rod passing through a U-shaped guide secured to the frame between the clip-ties, of means for retaining the adjusting-rod in any required position, substantially as described.

In testimony whereof I affix my signature in presence of two witnesses.

MYRON PATCHIN.

Witnesses:
C. P. PATCHIN,
ALBERT MORSE.